UNITED STATES PATENT OFFICE.

HEINRICH LINNEKOGEL, OF FEUERBACH-STUTTGART, GERMANY.

PROCESS FOR THE MANUFACTURE OF PLASTIC SUBSTANCES.

980,807.  Specification of Letters Patent.  Patented Jan. 3, 1911.

No Drawing.  Application filed April 21, 1910.  Serial No. 556,713.

*To all whom it may concern:*

Be it known that I, HEINRICH LINNEKOGEL, a subject of the King of Würtemberg, and resident of Feuerbach-Stuttgart, in the Kingdom of Würtemberg, German Empire, chemist, have invented a new and useful Process for the Manufacture of Plastic Substances, of which the following is a specification.

The object of the present invention is an improved process for the manufacture of plastic substances suitable for the production of figures, useful articles, articles of luxury, apparatus and instruments, as also of coverings for floors, walls and the like when laid upon either a rigid or flexible foundation or support.

According to this invention I employ a fibrous material as the base for the plastic substance and preferably industrial waste products of little value, such as for example the refuse from paper and cellulose factories, not however excluding the use of cellulose itself, wood pulp, pulp of every kind employed in the manufacture of paper, or the almost valueless waste fleece from cloth factories. The fibrous material is worked into a soft and plastic mass which upon exposure to the air gradually hardens without becoming brittle. To this end the mass is treated with glue suitably prepared to which a slight hardening or tanning effect has been imparted, for instance by the addition of a small quantity of tannin or salts of alumina bi-chromate of potash or other substance having a like effect and to which a hygroscopic substance, for instance glycerin, has been added. Finally it is necessary that the mass be worked into a perfectly homogeneous state and to add a little resin or colophony in an alkali solution and further a suitable mineral or vegetable oil.

The relative proportions of the above mentioned ingredients will vary according to the purpose to which the plastic substance is to be applied. It has been found however that the plastic substance can be advantageously produced in the following manner for example: The fibrous material forming the base is first boiled with a solution of glue until it becomes a consistent mass. A hygroscopic substance, for example glycerin, and a tanning or preserving substance, for example 1–2 per cent. of tannin are then added. To the resulting mass is added resinous soap or resin, colophony or the like in an alkali solution, for instance in diluted ammonia or gas liquor and further the necessary oil is directly added thereto. The oil may however be first mixed with the solution of resin or the like. The whole mass is then thoroughly worked and heated. When the heating is ended the product is allowed to cool for several hours whereupon it will be found to be extremely elastic and capable of receiving any required color.

Should a less consistent mass be desired this may be easily obtained by stirring with an added quantity of alkali fluids for instance a solution of soda or gas liquor.

For the production of special apparatus or in cases where the requirements demand that the material shall possess special properties the resin may be partially or wholly replaced by india-rubber, gutta-percha balata and the like in corresponding solution.

The finished product can be prepared in various colors and tints, packed in tins or other receptacles, transported to the place where it is to be used and there spread out with suitable tools. After two or three days the material becomes hard enough to be at once brought into use.

Either before or after hardening suitable decorative effects or patterns may be produced thereon in colors or plastic decorations may be added.

The material when laid upon a foundation adapts itself to any form or unevenness so that unlike the usual coverings for floors and walls it does not require the previous preparation of a smooth foundation. Joints, cracks and broken places common for example with a covering of linoleum especially when laid upon a rough or relatively sharp edged foundation, are avoided. Further as compared with coverings of linoleum, leather or leather paper it is easily handled and worked on the spot not only when laid for the first time but also during repairs. The product is also well adapted for modeling purposes. It can also be pressed into the greatest variety of forms in the production of figures and other various objects.

For floor coverings it has already been proposed to use a somewhat similar substance mixed with casein. The substance thus prepared however posseses several disadvantages. For instance it loses its elas ticity in a very short time after being laid down, and when laid upon a damp foundation cracks soon appear. The material soon becomes hard and brittle as sealing wax. A further disadvantage of the casein product is that it becomes foul. It must also be used very soon after its preparation as otherwise it becomes useless. On the other hand the material according to the present invention retains its properties unaltered for a long time. It can for instance be used in any desired thickness and even as thin as ¼ millimeter in which case the casein product would break and flake off in 3-4 weeks. The product according to the present invention will retain its high elasticity and property of resisting under all ordinary temperatures for years.

I claim:

1. Process for the production of a plastic substance which consists in treating a fibrous mass with glue, some tanning substance and a hygroscopic substance, adding to the resulting mass a resinous substance in alkali solution, india rubber, and an oil.

2. Process for the production of a plastic substance which consists in boiling fibrous material with a solution of glue, a tanning substance and a hygroscopic substance adding to the resulting mass a resinous substance in an alkali solution and an oil and thoroughly working the whole under continued heat.

3. Process for the production of a plastic substance which consists in boiling fibrous material with a solution of glue, a tanning substance and a hygroscopic substance adding to the resulting mass a resinous substance in an alkali solution and an oil, thoroughly working the whole under continued heat and finally allowing the product to cool.

4. Process for the production of a plastic substance which consists in boiling fibrous material with a solution of glue, a tanning substance and a hygroscopic substance adding to the resulting mass a resinous substance in an alkali solution, india rubber in solution and an oil and thoroughly working the whole under continued heat.

5. Process for the production of a plastic substance which consists in boiling fibrous material with a solution of glue, a tanning substance and a hygroscopic substance adding to the resulting mass a resinous substance in an alkali solution, india rubber in solution and an oil, thoroughly working the whole under continued heat and finally allowing the product to cool.

6. Process for the production of a plastic substance which consists in boiling fibrous material with a solution of glue until it becomes a consistent mass adding to said mass 1-2 per cent. of tannin, adding to the resulting mass a resinous substance in an alkali solution and oil, thoroughly working the whole under continued heat and finally allowing the product to cool.

7. Process for the production of a plastic substance which consists in boiling fibrous material with a solution of glue until becomes a consistent mass, adding to said mass 1-2 per cent. of tannin, adding to the resulting mass a mixture of a resinous substance in an alkali solution and oil, thoroughly working the whole under continued heat and finally allowing the product to cool.

8. Process for the production of a plastic substance which consists in boiling fibrous material with a solution of glue until it becomes a consistent mass, adding to said mass 1-2 per cent. of tannin, adding to the resulting mass a resinous substance in an alkali solution, india rubber in solution and oil, thoroughly working the whole under continued heat and finally allowing the product to cool.

9. A plastic substance comprising fibrous material as a base, glue, a tanning substance, resin, and alkali, india rubber and an oil.

10. A plastic substance comprising fibrous material as a base boiled in glue 1-2 per cent. of tannin, resin in ammoniated solution and oil.

11. A plastic substance comprising fibrous material as a base boiled in glue 1-2 per cent. of tannin, resin in ammoniated solution, india rubber in solution and an oil.

In witness whereof I have hereunto set my hand in the presence of two witnesses.

HEINRICH LINNEKOGEL.

Witnesses:
WOLDEMAR HAUPT,
HENRY HASPER.